Figure 1:
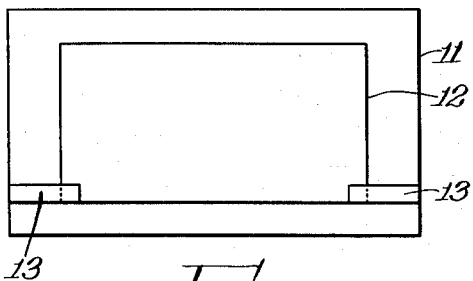

March 1, 1960 N. PRITIKIN 2,927,048

METHOD OF MAKING ELECTRICAL RESISTORS

Filed Feb. 15, 1957

INVENTOR.
Nathan Pritikin,
BY Fidler, Crouse &
Beardsley
Attys.

United States Patent Office 2,927,048
Patented Mar. 1, 1960

2,927,048

METHOD OF MAKING ELECTRICAL RESISTORS

Nathan Pritikin, Chicago, Ill.

Application February 15, 1957, Serial No. 640,429

5 Claims. (Cl. 117—215)

This invention relates to electrical resistors of the type having a resistance element in the form of a film, and to a method of making the same. It is an object of the invention to provide an improved electrical resistor of this type and an improved method of making the same.

Electrical resistors employing resistance films formed on a suitable insulating body are well recognized as having certain desirable characteristics which cannot be obtained in more conventional forms of resistors employing a substantial body of resistance material, such as conventional carbon resistors or wire wound resistors. However, the employment of resistance films of various types presents certain problems. One of these is the protection of the resistance film against the atmosphere. Various types of organic materials have been employed as coatings overlying resistance films with only limited success. Such organic coatings have the obvious disadvantage that they, themselves, are affected by atmosphere, and permit the passage of minute quantities of oxygen and moisture therethrough.

Applicant has disclosed and claimed jointly with Robert C. Camp in application Serial No. 475,938, entitled Electrical Resistor and Method of Making Same, filed December 17, 1954 (hereinafter referred to as the prior application), a film type resistor and a method of making the same in which a resistance film in the form of an iridized film or coating is covered and hermetically sealed by fused glass, the glass preferably being in intimate molecular contact with the iridized film. The resistors and the method of making the same, disclosed and claimed in the said prior application have certain limitations in applicability. The most important of these is that the resistance film must be of such character that it is not affected by the application of molten glass thereto. It is revealed in the prior application that, contrary to all reasonable expectations, glass may be fused to iridized films without harmful effect thereon, despite the fact that iridized films are recognized as being metallic oxides. Other resistance films, however, would be seriously affected by the application of molten glass thereto, with the result that the invention in the prior application is limited to resistors employing iridized films.

In accordance with the present invention, a fused inorganic coating such as glass may be employed in cooperation with resistacne films of material which are markedly and deleteriously affected by the application of molten glass thereto. Accordingly, the present invention permits the use of resistance films of a variety of materials and hermetic sealing thereof by fused glass or like material.

Accordingly, it is another object of the invention to provide an improved film type resistor which is hermetically sealed by a fused inorganic glass-like material and in which the resistance film may be composed of any one or more of a variety of materials which may be subject to deterioration by the application of molten glass-like materials thereto.

It is another object of the invention to provide an improved method of making such a resistor.

This invention, together with further objects and advantages thereof, will best be understood by reference to the following description taken in connection with the accompanying drawings, and its scope will be pointed out in the appended claims.

Figure 5:
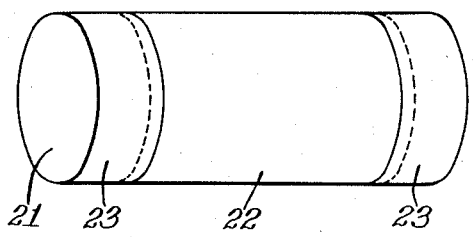
Figure 6:
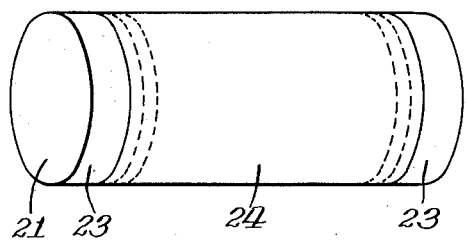
Figure 7:
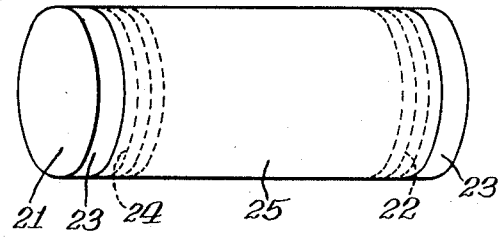

In the drawings, in which like parts are designated by like reference numerals:

Figures 1, 2, 3 and 4 are plan views of a resistor constructed in accordance with the preferred embodiment of the invention and showing successive steps in the production thereof; and Figs. 5, 6 and 7 are prospective views showing successive steps in the production of a resistor illustrating another embodiment of the invention.

In accordance with the preferred embodiment of the invention (Figs. 1–4) the resistor is built up on a flat insulated plate 11 whereby various steps in the production of the resistor may be performed on a large sheet incorporating several hundred individual resistor plates, the resistor plates being separated from each other following the completion of those steps which may be performed while the large sheet is intact. Preferably this sheet, constituting a plurality of plates 11, is composed of ordinary window glass but may alternatively be composed of any suitable insulating material which is able to withstand the temperature to which it must subsequently be subjected in the fusing of a protective coating, all as described in detail below. Still further, the sheet may, if desired, be constructed primarily of a conducting material, such as metal, provided that the surface thereof to which the resistor proper is applied is first covered with a suitable insulating material. Any such sheet or other base, whether of solid insulating material or of conducting material covered with insulating material, is herein referred to as an insulated sheet or base.

A resistance film 12 and a pair of spaced apart terminals 13 are applied to each plate 11 in any suitable manner, the materials thereof again being selected to withstand the temperature to which they must subsequently be subjected in the fusing of a protective coating.

The resistance film 12 may, for example, be an iridized coating or film of various well known materials; it may be an evaporated film of a high melting temperature metal such as nickel, chromium, Nichrome, silver, gold or platinum, or it may be of such metals applied by chemical reduction or by sputtering. The resistance film may also be of carbon or borocarbon applied in any well known manner.

The resistance film 12 preferably terminates inwardly of the edges of the plate 11 in order that it may be fully protected. Depending upon the method of application and the materials of the resistance film, such patterning of the resistance film on a plate 11, or on a large sheet from which a plurality of plates 11 can be cut, may be accomplished through the use of a mechanical mask, or a masking material which is applied to the plate or sheet. For the latter purpose a photographic emulsion may serve as a mask, the emulsion being removed after the application of the resistance film by a suitable solvent which will remove the photographic emulsion and, hence, the overlying portions of the resistance film.

Alternatively, the resistance film may be applied to the entire plate 11 or the large sheet which constitutes a plurality of the sheets 11. Subsequently a suitable resist is applied to those portions of the resistance film which are to be retained and a suitable solvent or etching compound may remove the exposed portions of the resistance film. The resist may then be removed by a suitable solvent which will not attack the remaining resistance film.

The terminals 13 may be a mixture of glass frit and silver in a suitable carrier as disclosed and claimed in application Serial No. 463,303 entitled Electrical Component and Method of Making Same, filed October 19, 1954, by the same inventor. Preferably after the carrier has dried, the plate or sheet is subjected to a temperature which causes the glass frit to fuse and bind the silver firmly to the plate 11. In this process the carrier is burned off. In Fig. 1 the terminals 13 are shown overlying the resistance film 12. Alternatively the terminals 13 may be applied first and the resistance film 12 may overlie the terminals. The resistance film 12 is shown in Fig. 1 as being a solid film but it may alternatively be arranged in a pattern, for example in a sinuous configuration to increase the total resistance value.

The plate 11, the resistance film 12, and the terminals 13 may be of various materials and may be applied by various processes, many of which are well known in the art and some of which are disclosed in the prior application and in application Serial No. 463,303 referred to above. Since these elements of the resistor and their methods of application do not in themselves constitute a feature of the present invention they are not described in further detail herein, although limitations as to the materials employed are further specified below.

Figure 2:
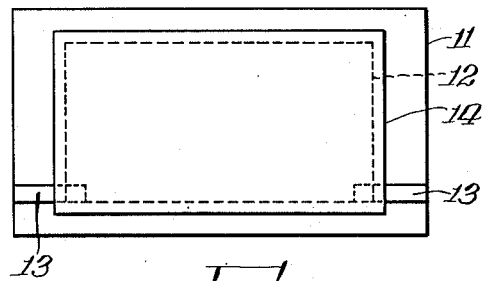
Figure 3:
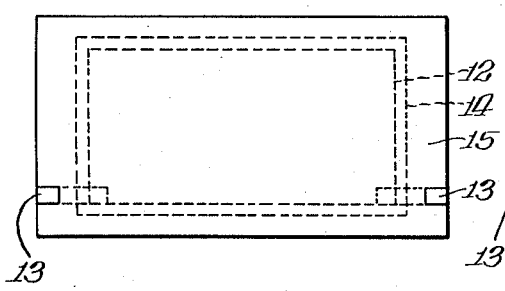
Figure 4:
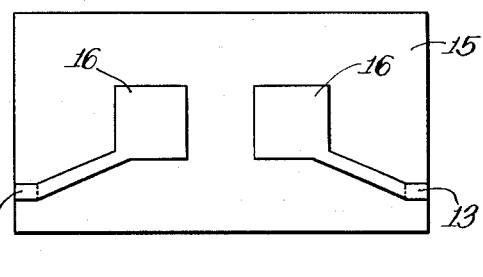

Following the application of the resistance film and the terminals to the plate 11, a barrier layer 14 of suitable material is applied to the resistance film and is arranged to leave at least a portion of each terminal 13 exposed, for example as shown in Fig. 2. The purpose of the barrier layer is to prevent direct contact between the resistance film 12 and a fused glass-like protective coating subsequently to be applied.

This barrier layer is preferably of finely ground material such as quartz, titanium dioxide, zinc oxide, aluminum oxide, or various other inorganic non-conducting materials. These may be applied by mixing with a suitable carrier or binder, the combination being applied in the desired pattern by any desired process such as printing, screening, painting, or rolling. The preferred material is powdered quartz and the binder may consist of 5% ethyl cellulose and 95% pine oil. The overall mixture may be 25% carrier and 75% powdered quartz depending upon the consistency desired for the method of application being employed. For convenience in handling, the pine oil may be allowed to evaporate or may be baked out. All elements of the carrier are, in any event, evaporated or burned out during subsequent operations. Where finely powdered quartz is employed (e.g. 1 micron particles) a film thickness of less than 1 mil may be employed. The barrier layer should cover the resistance film. This refers, of course, to the effective resistance film, namely the film extending between the terminals. That portion of the film overlying or underlying the terminals becomes, in effect, a part of the terminals.

Alternatively, the barrier layer may comprise a solid sheet of such material as glass or mica. Still further it may comprise a deposited film, produced, for example, by evaporation of a suitable material such as silicon monoxide or magnesium fluoride.

A frit of glass-like material is then laid over the previous deposits and may extend over the entire plate 11 with the exception of a portion of each of the terminals 13. This material is preferably glass and may be glass frit No. 1284 produced by the Drakenfeld Company of Washington, Pennsylvania. Alternatively however, this frit may be of any fusible glass-like material capable of forming a continuous film when fused.

The specific glass frit suggested above fuses at approximately 1,000° F. This relatively low fusing temperature permits the use of a wider variety of materials for the plate 11, the resistance film 12, the terminals 13, and the barrier layer 14, than would be permitted if the glass frit had a substantially higher fusing temperature. It is the fusing temperature of the glass frit which has been referred to above as limiting the materials of these other elements of the overall resistor construction. Where the glass frit is of the particular material suggested immediately above, the glass plate may be of ordinary window glass (the softening point of which is well above 1,000° F.) and the resistance film, the terminals, and the barrier layer may be of any of the materials suggested above (the softening point of quartz being, of course, higher than 1,000° F.). More specifically, the frit of the protective film must be heated to its softening point in order that it may form a continuous film. At this temperature the materials of the barrier layer and the base should not soften, and the resistance film must, of course, retain its form. The terminals may, however, soften without detriment. More particularly, in the case of the recommended mixture of silver and glass frit for the terminals, the glass frit thereof may resoften during the fusing of the protective coating without harm.

The glass frit should also be selected such that its coefficient of expansion nearly equals that of the glass plate. The specific glass frit suggested above has an expansion coefficient of approximately $7.5 \times 10^{-6}$ whereas ordinary window glass has an expansion coefficient of approximately $8.3 \times 10^{-6}$. These expansion coefficients are nearly enough matched to obtain good results.

The resistance film should also have a coefficient of expansion roughly approximating that of the glass plate 11 and the fused glass-like protective coating 15, although a greater difference is considered permissible in this case than between the fused protective coating 15 and the glass plate 11. The resistance film should also be capable of withstanding the applied heat without cracking or crazing.

The barrier layer 14 should also have a coefficient of expansion roughly approximating the other elements of the overall resistance construction even though it is in particle form. Here again a substantial difference in coefficient is permissible, depending upon various factors such as the fineness of the particles, the thickness of the barrier layer, and the extent to which the upper surface thereof may fuse to the protective coating 15.

The principal feature of the present invention is the employment of the barrier layer 14 which prevents direct contact between the fused glass-like protective coating 15 and the resistance film 12. By virtue of the presence of the barrier layer 14 it becomes possible to use various materials for the resistance film 12 which would be subject to substantial deterioration or even complete destruction by exposure to molten glass, i.e., the glass frit during the time that it is being fused into a continuous protective coating 15.

Powdered quartz has been found to form an excellent barrier layer. Its melting or softening temperature is substantially above that of the glass frit and accordingly does not itself soften or melt and thereby subject the resistance film to the deleterious action of molten glass-like materials. Even a very thin film of ½ mil or less prevents the glass frit from reaching the resistance film while it is being fused into a continuous protective coating. It should be noted that the upper portions of the barrier layer may become fused to or combine with the protective coating 15 during the fusing of the glass frit while the remainder of the barrier layer continues to provide protection of the resistance film from contact with the fused glass frit.

Entrapped within the barrier layer there is of course a very small amount of air. It has been found, however, that this quantity of air is so minute that it has no appreciable effect on the resistance film. If desired the resistor may be placed in an oven having an inert atmosphere for the fusing of the glass frit, in which case the gas entrapped in the barrier layer would of course be inert.

The exposed portions of the terminals 13 are, of course, employed to make contact with suitable leads. Such leads may be soldered directly to the exposed portions of the terminals, or enlarged terminals 16 of any suitable type may be made to overlie the fused coating 15. Preferably a second insulated sheet is arranged to overlie the sheet 11 to secure the leads and provide protection of the resistor proper from physical abuse. The overall construction may be like that disclosed and claimed in said application Serial No. 463,303 or in application Serial No. 299,797, entitled Electrical Resistor and Method and Apparatus for Producing Resistors, filed July 19, 1952, by the same inventor.

Another embodiment of the invention is disclosed in Figs. 5–7 wherein the base is a cylinder. This can be solid or tubular, and shall hereafter be referred to as a rod 21. In this embodiment of the invention an elongated rod may be employed for the production of a plurality of resistors, the rod being broken to form individual resistors following the performance of those steps which may be performed while the elongated rod is intact.

The resistance film 22 is first applied to the rod 21 and may terminate short of the ends of what will eventually be the rod for an individual resistor. Alternatively the resistance film may extend throughout the length of the rod. Terminals 23 are then applied as shown in Fig. 5. Alternatively the terminals may be applied first and the resistance film may overlie the terminals.

A barrier layer 24 is subsequently applied and is preferably arranged to overlie at least a small portion of the terminals 23 in order to assure that it covers the entire resistance film, i.e., the effective resistance film extending between the two terminals. Glass frit is then applied over the barrier layer and is fused to form a film 25.

Leads may then be secured to the remaining exposed portions of the terminals 23. Such leads may comprise conventional wire leads wrapped around the terminals 23 or they may be expanded leads which extend over the ends of the construction. Since such leads are well known in the art and do not in themselves constitute a feature of the present invention, they are not shown in the drawings or described in further detail herein.

The various films, namely, the resistance film 22, the terminals 23, the barrier layer 24, and the protective film 25, may be formed of the same materials as suggested for the above described embodiment of the invention. In general the operations may be the same as employed in the first described embodiment of the invention except for mechanical operations which differ because of the physical form of the base. Two specific forms of base have been suggested above. It will be apparent that various other forms may be employed without differentiating from the spirit of the invention.

It will be apparent that the invention may be varied in its physical embodiment without departing from the spirit of the invention, and it is desired, therefore, that the invention be limited only by the scope of the appended claims.

The invention having thus been described, what is claimed and desired to be secured by Letters Patent is:

1. The method of making resistors which comprises, applying a resistance film and spaced apart terminals to an insulated base with said resistance film in electrical contact with said terminals, depositing a barrier layer of inorganic insulating material on said resistance film, depositing a layer of fusable inorganic insulating material over said barrier layer, and fusing said last mentioned material to form a sealed protective layer, the materials of said base, said resistance film, and said barrier layer being selected to have a higher softening temperature than the material of said protective layer, the materials of said barrier layer and said protective layer being selected to resist dissolution of said barrier layer by the material of said protective layer.

2. The method of making resistors which comprises, applying a resistance film and spaced apart terminals to an insulated base with said resistance film in electrical contact with said terminals, depositing a barrier layer of particles of inorganic insulating material on said resistance film, depositing a layer of fusable inorganic insulating material over said barrier layer, and fusing said last mentioned material to form a sealed protective layer, the materials of said base, said resistance film, and said barrier layer being selected to have a higher softening temperature than the material of said protective layer, the materials of said barrier layer and said protective layer being selected to resist dissolution of said barrier layer by the material of said protective layer.

3. The method of making resistors which comprises, applying a resistance film and spaced apart terminals to an insulated plate with said resistance film in electrical contact with said terminals, depositing a barrier layer of inorganic insulating material on said resistance film, depositing a layer of particles of fusible inorganic insulating material over said barrier layer, and fusing said last mentioned material into a continuous protective layer, the materials of said plate, said resistance film, and said barrier layer being selected to have a higher softening temperature than the material of said protective layer, the materials of said barrier layer and said protective layer being selected to resist dissolution of said barrier layer by the material of said protective layer.

4. The method of making resistors which comprises, applying a resistance film and spaced apart terminals to an insulated rod with said resistance film in electrical contact with said terminals, depositing a barrier layer of inorganic insulating material on said resistance film, depositing a layer of particles of fusible inorganic insulating material over said barrier layer, and fusing said last mentioned material into a continuous protective layer, the materials of said rod, said resistance film, and said barrier layer being selected to have a higher softening temperature than the material of said protective layer, the materials of said barrier layer and said protective layer being selected to resist dissolution of said barrier layer by the material of said protective layer.

5. The method of making resistors which comprises, applying a resistance film and spaced apart terminals to a glass plate with said resistance film in electrical contact with said terminals, depositing a barrier layer of quartz particles on said resistance film, depositing a layer of glass frit over said barrier layer, and fusing said glass frit into a continuous protective layer, the materials of said glass plate and said resistance film, being selected to have a higher softening temperature than said glass frit.

References Cited in the file of this patent

UNITED STATES PATENTS

| | | |
|---|---|---|
| 1,663,660 | Hottinger | Mar. 27, 1928 |
| 2,105,166 | Schwarzkopf | Jan. 11, 1938 |
| 2,385,573 | Hommel | Sept. 25, 1945 |
| 2,457,678 | Jira | Dec. 28, 1948 |
| 2,491,965 | Ganci | Dec. 20, 1949 |
| 2,777,044 | Lytle | Jan. 8, 1957 |
| 2,818,354 | Pritikin et al. | Dec. 31, 1957 |

FOREIGN PATENTS

| | | |
|---|---|---|
| 470,530 | Italy | Apr. 10, 1952 |